Aug. 19, 1958 R. L. WEIDA 2,848,532
DATA PROCESSOR
Filed June 1, 1954 4 Sheets-Sheet 1

ERROR DETECTOR 21

ERROR DETECTOR 49

INVENTOR.
ROBERT L. WEIDA
BY S.C. Yuter
ATTORNEY

INVENTOR.
ROBERT L. WEIDA
BY S.C. Yuter
ATTORNEY.

DATA PROCESSOR

Filed June 1, 1954

4 Sheets-Sheet 3

INVENTOR.
ROBERT L. WEIDA
BY S.C. Yuter
ATTORNEY.

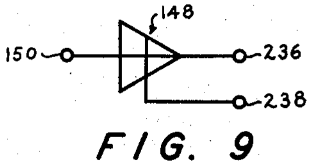
FIG. 9
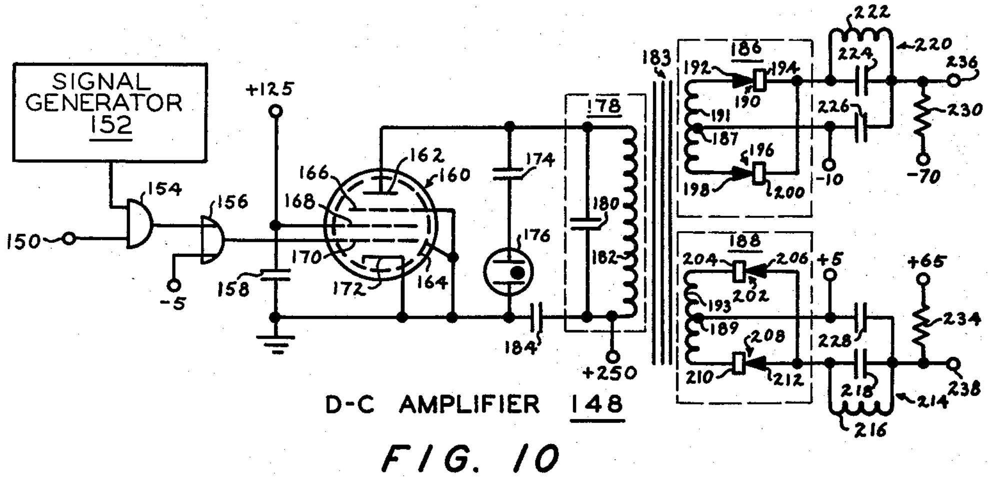
FIG. 10
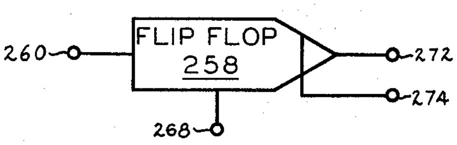
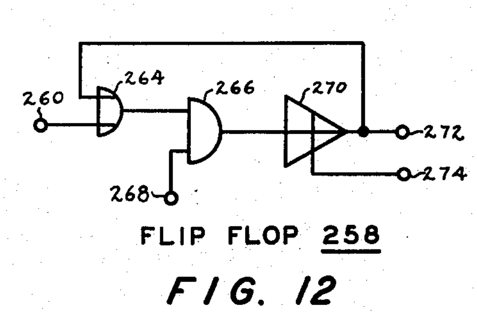
FIG. 11 FIG. 12
INVENTOR.
ROBERT L. WEIDA
BY S.C. Yuter
ATTORNEY.

United States Patent Office 2,848,532

Patented Aug. 19, 1958

2,848,532

DATA PROCESSOR

Robert L. Weida, Elmhurst, N. Y., assignor to Underwood Corporation, New York, N. Y., a corporation of Delaware Application June 1, 1954, Serial No. 433,524

16 Claims. (Cl. 178—23)

This invention relates to data processors and more particularly to devices for detecting errors in data handled by digital data processors.

Digital data processors are those processors in which information is represented by combinations of "characters." A character may be a numerical digit, a letter of the alphabet or any symbol which may be used to express information.

In many digital data processors, the characters are represented by binary numbers. For example, certain electronic digital computers of the data processing type process numerical information after the characters have been binarily coded as indicated by Table I.

TABLE I

| Character | Binary Code |
|---|---|
| 0 | 0000 |
| 1 | 0001 |
| 2 | 0010 |
| 3 | 0011 |
| 4 | 0100 |
| 5 | 0101 |
| 6 | 0110 |
| 7 | 0111 |
| 8 | 1000 |
| 9 | 1001 |

The binary code is not an arbitrarily chosen code, but is based upon the binary system which uses the binary digits (or "bits") one and zero. The binary system is a numerical means of expressing a quantity in terms of coefficients of powers of two. For example, the decimal digit 7 is expressed as 111 in the binary system as shown below:

Decimal:
- As used 7
- As understood $7(10)^0$
- Or $7\times1=7$

Binary:
- As used 111
- As understood $1(2)^2+1(2)^1+1(2)^0$
- Or $4+2+1=7$

Since the base of this system is two, each coefficient only needs two distinct values, and zero and one are used for this purpose. It should be noted that binary numbers have a normal sequence as is typical of number systems.

The number of bits in a group used to represent a character in any particular data processing system depends upon the number of characters which must be coded. Thus, if ten characters are to be coded, the groups must contain a sufficient number of bits with which to form at least ten different combinations. The number of combinations possible with "$n$" number of bits in a group is expressed as $2^n$ and is illustrated in Table II.

TABLE II

| No. of Bits=$n$ | No. of Combinations |
|---|---|
| 1 | 2 (a one or a zero) |
| 2 | 4 |
| 3 | 8 |
| 4 | 16 |
| 5 | 32 |
| 6 | 64 |

Therefore, if data is to be expressed by ten characters (e. g. zero through nine), four-bit groups are used because up to sixteen characters can be represented. The three-bit groups with eight combinations do not have enough combinations. If thirty-six characters (e. g. ten numbers and the letters of the alphabet) are used, the six-bit group is chosen since there are only thirty-two combinations available with five-bit groups and up to sixty-four characters can be expressed by a six-bit group.

There are frequently more combinations available in the chosen system than there are characters to be coded. These surplus combinations can be used for error-detection purposes in digital data processors.

One form of error detection which uses surplus combinations consists of inspecting the data for the surplus code groups which do not represent characters. Such code groups can only exist in the data processor by error and indicate imperfect performance by the data processor.

One of the more difficult errors to detect is the inadvertent loss of information because the loss of information cannot be distinguished from data which consists of zeros. To circumvent the difficulties inherent in detecting the loss of data, many digital data processors use "excess" codes.

Representing characters in excess codes consists of representing each character by its binary equivalent plus a constant. For example, in the excess-three code, zero is represented as the sum of 0000 and 0011 (three) which equals 0011. Table III illustrates how the decimal characters zero through nine are represented by a predetermined sequence in the excess-three code.

TABLE III

| Decimal Character | Excess-three Code |
|---|---|
| 0 | 0011 |
| 1 | 0100 |
| 2 | 0101 |
| 3 | 0110 |
| 4 | 0111 |
| 5 | 1000 |
| 6 | 1001 |
| 7 | 1010 |
| 8 | 1011 |
| 9 | 1100 |

It should be noted that the following four-bit groups are not used in the code of Table III for coding decimal characters: 0000, 0001, 0010, 1101, 1110, and 1111. The presence of any of these "disallowed" groups in a data processing system using the code indicates that an error (or fault) has occurred.

Error indicating apparatus, which is part of a digital data processor in which an excess code is used, can therefore perform an important function by indicating either that a code group is allowed or disallowed.

It is an object of the invention to provide an improved error detecting device.

Another object of the invention is to provide apparatus which operates on electrical signals to determine whether a code group lies outside of the limits of a predetermined sequence of code groups.

A further object of the invention is to provide an improved error-checking device which can operate at very high speeds.

A still further object is to provide improved error-detecting apparatus for data processors which employ the excess-three code.

Briefly, an error-detecting device in accordance with the invention includes comparators for sequentially checking the bits of a code group with the bits of standard code groups to determine whether the code group is greater than the highest allowed code group or less than the lowest allowed code group. The results of the comparisons are combined to indicate whether the inspected code group is disallowed code group.

Certain of the excess codes are "symmetrical" codes; i. e., there are as many disallowed combinations which are greater than the allowed combinations as there are disallowed combinations which are less than the allowed combinations.

One advantage of error detectors built in accordance with the invention is that, when operating with a symmetrical excess code, only one standard code group is required for making comparisons. Thus, the required number of input signals is minimized.

Other advantages are that the apparatus is simple and inexpensive and can conveniently operate with signals supplied at high speeds.

The invention will be more readily understood from the following description and the accompanying drawing in which:

Fig. 9 shows the symbol for a D.-C. amplifier.

Fig. 10 illustrates the circuit represented by the symbol of Fig. 9.

Fig. 11 shows the symbol for a flip flop.

Fig. 12 is a logical diagram of the circuit represented by the symbol of Fig. 11.

Apparatus of the invention will be described for operation with indicia such as electrical signals which are received from an electronic digital-data processor. Hereinafter, the terms "code group" and "binary number," as well as electrical signals representative thereof, will be used interchangeably unless otherwise indicated by the text.

Figure 1:
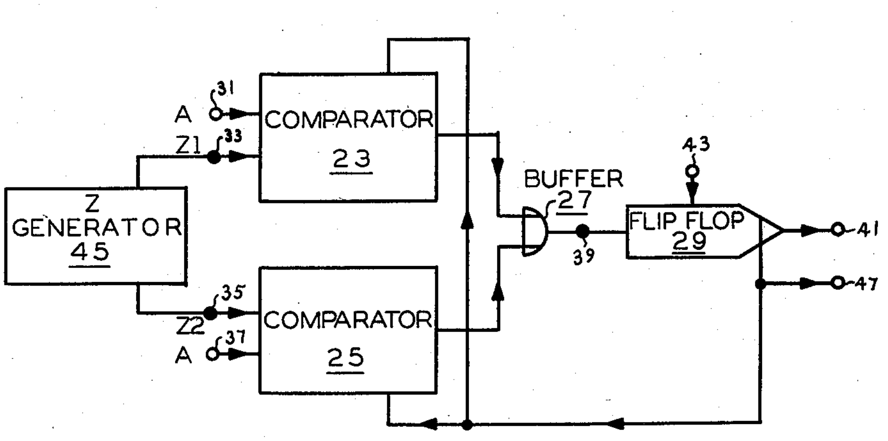
Fig. 1 is a block diagram of an error detector in accordance with the invention.

Referring now to the apparatus shown in Fig. 1, an error detector 21 is shown comprising comparators 23 and 25, a buffer 27, and a flip flop 29. Standard code groups are generated by the Z generator 45.

The error detector 21 produces a positive signal when an inspected code group (A) is not one of a predetermined sequence of code groups. The lowest allowed code group of the predetermined sequence is hereinafter designated Z1; the highest allowed code group is hereinafter designated Z2.

The comparator 23 functions to compare the code group (A) with a standard code group (Z1) and transmits a positive signal to the buffer 27 if A is less than Z1. The comparator 23 includes the terminals 31 and 33 by which A and Z1 are respectively received.

The comparator 25 functions to compare A with a second standard code group (Z2) and transmits a positive signal to the buffer 27 if A is greater than Z2. The comparator 25 includes the terminals 35 and 37 by which Z2 and A are respectively received.

Except under the conditions described above, the comparators 23 and 25 transmit a negative signal to the buffer 27. This negative signal indicates that A is neither less than Z1 nor greater than Z2.

The buffer 27 which is an "or" gate is a crystal diode network which functions to receive input signals via a plurality of input terminals and to pass the most positive signal. Thus, when either of the comparators 23 or 25 produces a positive signal, the signal is passed by the buffer 27.

The output terminal of the buffer 27 is coupled to the set terminal 39 of the flip flop 29 which includes the positive output terminal 41, the reset terminal 43, and the negative output terminal 47.

The flip flop 29 (hereinafter described in greater detail) is a bi-stable electronic circuit. Its positive output terminal 41 is maintained at a negative (or "no-signal") potential level to indicate a "reset" stable state. During the reset stable state, the negative output terminal 47 is maintained at a positive potential level.

When the flip flop 29 receives a positive signal via the set terminal 39, the positive output terminal 41 is raised to a positive potential level to indicate a "set" stable state and the negative output terminal 47 becomes negative. The reset terminal 43 is provided to permit the "resetting" of the flip flop 29 as will hereinafter be explained.

Thus, if the comparator 23 determines that A is less than Z1 or the comparator 25 determines that A is greater than Z2, a positive signal is transmitted via the buffer 27 to the flip flop 29 which is thereby set. The error detector 21 thus produces a positive signal at the positive output terminal 41 to indicate that A is a disallowed code group.

For example, if the code indicated by Table III is used, Z1 equals 0011 and the comparator 23 produces a positive signal to set the flip flop 29 when A is 0000, 0001, or 0010. Z2 equals 1100 and the comparator 25 produces a positive signal to set the flip flop 29 if A is 1101, 1110, or 1111.

It should be noted that if A is an allowed code group, an indication is given by the absence of a positive signal at the positive output terminal 41. The circuit can also be simply modified to give a positive signal when A is an allowed code group as will be shown.

The negative signal which appears at the negative output terminal 47 when the flip flop 29 is set is transmitted to the comparators 23 and 25 to return them to their initial state.

As previously noted, standard code groups are produced by the Z generator 45 for use in the error detector 21. The Z generator 45 can be, for example, magnetic drum apparatus such as described in the copending application of Samuel Lubkin, Serial No. 370,538, filed July 27, 1953, and assigned to the same assignee. Z1 and Z2 are recorded on the magnetic drum and are transmitted respectively to the terminals 33 and 35.

The comparators 23 and 25 may be such as described and claimed in the copending application of Samuel Lubkin, Serial No. 425,019, filed April 20, 1954, and assigned to the same assignee.

Figure 2:
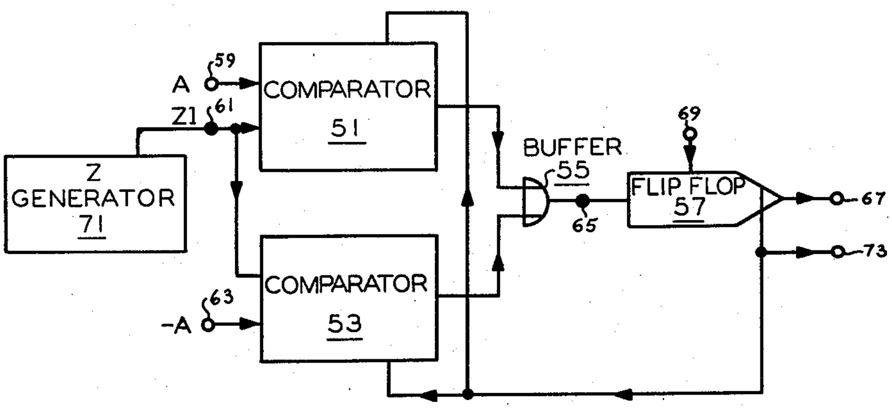
Fig. 2 is a block diagram of an error detector with simplified input circuitry for operation with a symmetrical excess code.

Referring now to the apparatus of Fig. 2, an error detector 49 is shown comprising comparators 51 and 53, a buffer 55, and a flip flop 57. The Z generator 71 supplies the standard code group (Z1).

The comparator 51 includes the terminals 59 and 61 by which the code group (A) and the standard code group (Z1) are respectively received.

The comparator 53 receives the same standard code group (Z1) and includes a terminal 63 by which the complement of A (hereinafter referred to as —A) is received.

Signals are transmitted from the comparators 51 and 53 via the buffer 55 to the set terminal 65 of the flip flop 57. The flip flop 57 transmits signals via the positive and negative output terminals 67 and 73 and is reset via the reset terminal 69.

Complements used in the error detector 49 are (radix-1)'s complements and are derived by simply substituting zeros for ones and ones for zeros in the binary number which is the code group whose complement is desired.

The error detector 49 includes substantially the same circuitry as the error detector 21 (of Fig. 1) except that the input circuitry receives only the one standard code group Z1.

The error detector 49 functions to detect disallowed combinations in a symmetrical excess code (previously described) and utilizes certain characteristics of binary numbers so that only one standard code group is required for comparison.

The binary characteristic which is used is as follows: In an $n$-bit code group system, the lowest binary number is equal to the complement of the highest binary number (and vice versa), the second lowest number is equal to the complement of the second highest number (and vice versa) and so forth.

Table IV shows the complements of four-bit code groups and illustrates the aforementioned characteristic. The limits of the allowable sequence of combinations (or numbers) in a symmetrical excess code can be expressed as $r$ and $2^n-(r+1)$ where $r$ is the lowest allowed number and $n$ equals the number of bits in each combination.

TABLE IV

| Binary Number | Position | Complement |
|---|---|---|
| 0000 | Lowest | 1111 |
| 0001 | 2nd lowest | 1110 |
| 0010 | 3rd lowest | 1101 |
| 0011 | 4th lowest | 1100 |
| 0100 | 5th lowest | 1011 |
| 0101 | 6th lowest | 1010 |
| 0110 | 7th lowest | 1001 |
| 0111 | 8th lowest | 1000 |
| 1000 | 8th highest | 0111 |
| 1001 | 7th highest | 0110 |
| 1010 | 6th highest | 0101 |
| 1011 | 5th highest | 0100 |
| 1100 | 4th highest | 0011 |
| 1101 | 3rd highest | 0010 |
| 1110 | 2nd highest | 0001 |
| 1111 | Highest | 0000 |

Because of this characteristic, in a symmetrical excess code (wherein the number of disallowed code groups which are less than the lowest allowed code group equals the number of disallowed code groups which are greater than the highest allowed code group), the complements of the higher disallowed code groups each equal one of the lower disallowed code groups.

For example, in a symmetrical excess-three code, the lower disallowed code groups are 0000, 0001 and 0010 and the higher disallowed code groups are 1101, 1110 and 1111. The complements of 1101, 1110 and 1111 are respectively 0010, 0001 and 0000 which each equal one of the lower disallowed code groups.

Therefore, each of the lower disallowed code groups and the complements of each of the higher disallowed code groups are less than the lowest allowed code group. Accordingly, if a binary number and its complement are compared to the lowest allowed binary number, the occurrence of numbers which lie outside of the given sequence of allowed numbers will be detected.

For example, if the digital data processor transmits signals representing 1101 and 0010 (the complement) to the error detector 49, the comparator 53 compares —A with Z1, detects that 0010 is less than 0011, and indicates that 1101 is a disallowed code group.

Similarly, each of the higher disallowed code groups and the complements of the lower disallowed code groups are higher than highest allowed binary number. Therefore, error detecting can be similarly accomplished by comparison with the highest allowed code group.

An advantage of using the single standard code group for comparison purposes is that storage requirements for the standard are thereby reduced so that the storage facilities can be used for storing vital data. No storage problem is encountered in supplying the complements of the numbers to be tested as the apparatus for supplying these complements is very simple as will be shown.

Figure 3:
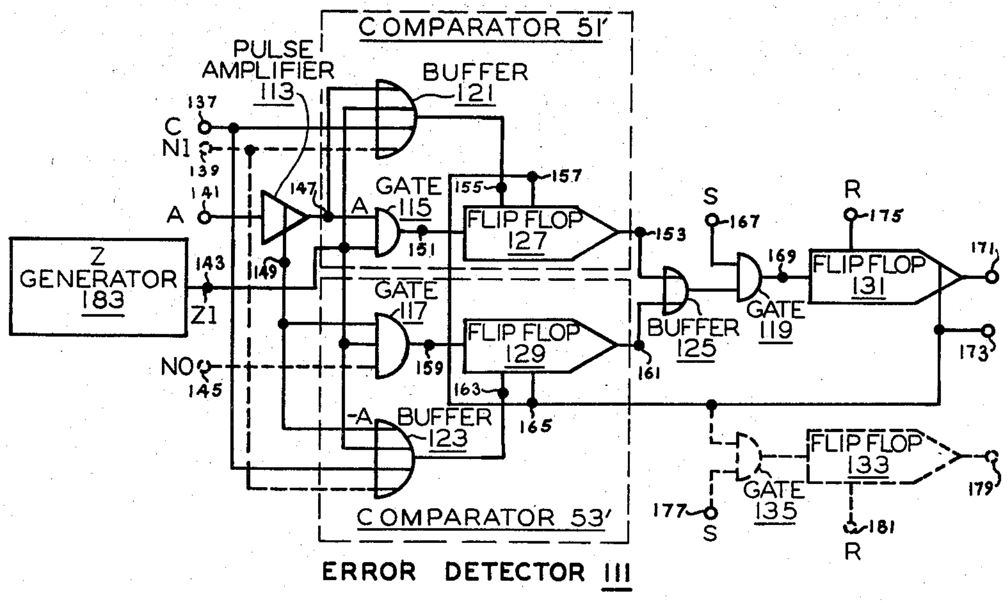
Fig. 3 is a detailed logical diagram of an error detector of the type illustrated by Fig. 2.

Referring now to the apparatus shown in Fig. 3, an error detector 111 is shown in logical detail in accordance with the diagram of Fig. 2. The error detector 111 operates on data coded in a symmetrical excess-three code.

The error detector 111 comprising the comparators 51' and 53', includes the pulse amplifier 113, the gates 115, 117 and 119, the buffers 121, 123 and 125, the flip flops 127, 129 and 131 and may also include the gate 135 and the flip flop 133. The error detector 111 receives signals via the terminals 137, 139, 141, 143 and 145.

More particularly, the error detector 111 receives the signals C, N1 and N0 (hereinafter described in detail) via the terminals 137, 139 and 145, respectively. The code group A (to be inspected for error) is received via the terminal 141. The standard code group Z1 is received via the terminal 143.

The code group A is transmitted via the terminal 141 to the pulse amplifier 113. The pulse amplifier 113 (hereinafter described in detail) includes a positive output terminal 147 and a negative output terminal 149. During the absence of a positive pulse at the terminal 141, a negative potential appears at the positive output terminal 147 and a positive signal appears at the negative output terminal 149. Upon the receipt of a positive signal at the terminal 141 a positive signal appears at the positive output terminal 147 and a negative signal appears at the negative output terminal 149 for the duration of the pulse received by the pulse amplifier 113.

The pulse amplifier 113 functions to complement the received code group and the signal which appears at the negative output terminal 149 represents this complement.

The pulse amplifier 113 transmits the signal representing the (uncomplemented) code group via the positive output terminal 147 to the gate 115 and to the buffer 121; the signal representing the complement of the code group is transmitted via the negative output terminal 149 to the gate 117 and to the buffer 123.

The standard code group Z1 is generated by the Z generator 183 and is transmitted via the terminal 143 to the gates 115 and 117 and to the buffers 121 and 123.

The C pulses are transmitted via the terminal 137 to the buffers 121 and 123. The narrow pulses N1 are transmitted via the terminal 139 to the buffers 121 and 123. The narrow pulses N0 are transmitted via the terminal 145 to the gate 117.

The gates used in the system are crystal diode networks (hereinafter described in detail) which function to pass the most negative signal received and thus pass a positive signal only when all received signals are positive.

Signals passed by the gates 115 and 117 are transmitted via the set terminals 151 and 159 to the flip flops 127 and 129, respectively.

The flip flop 127 includes the positive output terminal 153 and the reset terminals 155 and 157. The flip flop 129 includes the positive output terminal 161 and the reset terminals 163 and 165.

The positive output terminals 153 and 161 are coupled via the buffer 125 to the gate 119. Also connected to the gate 119 is a terminal 167 by which a signal S is received. The signal S will hereinafter be described in detail.

Signals passed by the gate 119 are fed to the set terminal 169 of the flip flop 131. The flip flop 131 includes the positive output terminal 171, the negative output terminal 173 and the reset terminal 175. The function of the flip flop 131 is to "remember" an indication passed by the gate 119.

The negative output terminal 173 is connected to the reset terminals 157 and 165 and can be coupled to a gate such as gate 135 whose other input terminal is the terminal 177 by which the signal S is received. Signals passed by the gate 135 are fed to the flip flop 133 which includes the positive output terminal 179 and the reset terminal 181.

Data is received by the error detector 111 in the form of electrical signals in which ones are represented by pulses and zeros by the absences of pulses. The pulses and absences of pulses are serially arranged with the least significant binary digit occurring earliest.

The pulses received by the system are arbitrarily chosen to be square-wave pulses having a fifty percent duty cycle. Other wave forms and duty cycles can also be used.

The time which elapses between the leading edges of two pulses occurring successively (and expressing two adjacent ones) is hereinafter referred to as a pulse time or pulse position. Each pulse time is designated TN; N representing the relative time position of the beginning of the pulse time. Hence, T0 is the initial pulse time and is followed by T1. Since digital data processors normally operate at a constant repetition rate, all pulse times are of equal time duration.

Figure 4:
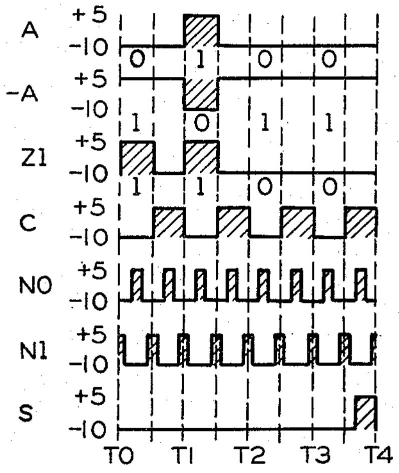
Fig. 4 is a signal chart which shows an illustrative set of signals for the apparatus of Fig. 3.

Referring now to the signal chart of Fig. 4, an illustrative set of signals which may be received by the error detector 111 is shown. A has been chosen to be the disallowed code group 0010. It should be noted on the signal chart that the order of the bits is reversed and that the bits of each code group are fed to the error detector 111 in increasing order of significance (i. e. least significant bit first).

Thus A is represented sequentially as no pulse (T0), pulse (T1), no pulse (T2), no pulse (T3).

Similarly, the order of the bits of Z1 (0011) is reversed and Z1 is sequentially represented as pulse (T0), pulse (T1), no pulse (T2), no pulse (T3).

It will be noted by inspection of the signals A and Z1 that the absence of a pulse is represented by a reference potential of minus ten volts. Further, the positive potential achieved by the pulses is plus five volts (idealized). It should be additionally noted that the presence or absence of a pulse is indicated during only a portion (the first half) of each pulse time.

As previously indicated, the pulse amplifier 113 of Fig. 3 transmits plus five volts from the negative output terminal 149 until a positive pulse is received via the terminal 141. During the occurrence of this positive pulse, minus ten volts is transmitted from the negative output terminal 149.

Referring again to Fig. 4, a resultant negative-going pulse is seen during the first half of T1 of the signal —A. Since the potential during the first half of T1 is minus ten volts, a zero is indicated.

Inspection of the signal —A shows that the signal represents 1101 (shown in reverse on the chart) which is the complement of A.

A and Z1 are fed to the gate 115 and since Z1 has a positive pulse in each of its first two pulse positions, the gate 115 passes a positive signal if A includes a positive pulse in either of its first two pulse positions.

In the particular case illustrated by the signal chart, A and Z1 are coincidentally positive during T1. Therefore, at T1 the gate 115 passes a positive signal and the flip flop 127 is set.

A and Z1 are also fed to the buffer 121 as are the signals C and N1. If the buffer 121 passes a continuous positive signal to the reset terminal 155 after the flip flop 127 is set, the flip flop 127 is maintained in a set condition (the reset terminal 157 being normally maintained at a positive potential by the negative output terminal 173).

Since Z1 contains zeros and is negative during T2 and T3, A must combine with C and N1 to cause the buffer 121 to pass the continuous positive signal if the flip flop 127 is to be maintained in a set condition.

The signal C consists of series of positive pulses having a fifty percent duty cycle. Apparatus for providing C can be the cycling unit described and claimed in the copending application of Samuel Lubkin, Serial No. 370,538, filed July 27, 1953, and assigned to the same assignee.

The duty cycle of a C pulse occurs during the second half of its pulse period. Thus, a C pulse combined with a pulse of A provides a continuous positive potential during a pulse period.

The signal N1 consists of a series of narrow pulses which are phased so as to overlap both C pulses and associated pulses of A. For example, during T1 of the signal chart, a pulse of A and a C pulse combine at the buffer 121 to provide a continuous positive input potential. A pulse N1 occurring at midpoint of T1 overlaps (timewise) both pulses. The function of N1 pulses is to prevent discontinuities in the input signal formed by information pulses (such as pulses of A when they occur) and C pulses. The buffer 121 is thus enabled to produce a continuous positive output signal during the pulse period in which an information pulse occurs.

It should be noted that if the C pulses and information pulses are accurately phased and have good rise and delay times, N1 pulses are unnecessary since no interval can then occur between a C pulse and its associated information pulse.

Apparatus for providing N1 pulses may be such as the cycling unit described and claimed in copending application of Samuel Lubkin, Serial No. 370,538, filed July 27, 1953, and assigned to the same assignee.

Thus, if O contains a pulse in each of the T2 and T3 pulse positions, the flip flop 127 will remain in a set state if it has been previously set.

It should now be noted that only the highest allowed code group (1100) and the higher disallowed code groups (1101, 1110 and 1111) have pulses during T2 and T3. Therefore, only these code groups are capable of maintaining the flip flop 127 in a set condition after it has been previously set.

The highest allowed code group (1100) does not, however, initially set the flip flop 127 because of the absence of pulses during T0 and T1 and thus the presence of pulses during T2 and T3 has no effect.

As a result, only the higher disallowed code groups are detected by the flip flop 127 since they both set and maintain the flip flop 127 in a set condition.

In the example of the signal chart, the flip flop 127 is set during T1 but is reset at the beginning of T2 at which time the inputs A and Z1 to the buffer 121 are coincidentally negative.

The flip flop 129 is used to detect the lower disallowed groups and the complements of these groups can both set and maintain the flip flop 129 in a set condition as next described.

The operation of the flip flop 129 and associated circuitry is similar to that of the flip flop 127. Because of the receipt of Z1 at the gate 117, a complement (—A) having pulses during T0 or T1 sets the flip flop 129.

The buffer 123 functions as does the buffer 121 so that, after the flip flop 129 is set, the buffer 123 must produce a continuous positive signal to maintain the set condition of the flip flop 127.

It should be noted that in the example of the signal chart, the flip flop 129 is set during T0 and remains set until the end of the code group (except as hereinafter modified) and so indicates that A is a lower disallowed code group.

The positive signal which occurs at either of the positive output terminals 153 and 161 to indicate the occurrence of a disallowed code group is fed via the buffer 125 to the gate 119.

A positive sampling pulse S is fed via the terminal 167 to the gate 119 at the end of each code group as shown in Fig. 4. The pulse S enables the gate 119 to pass a pulse to the set terminal 169 if either of the flip flops 127 and 129 have been set and maintained in a set condition during the inspection of the code group and its complement.

The flip flop 131 is set by the pulse fed to the set terminal 169 and produces a positive signal at the positive output terminal 121. This signal is indicative of the occurrence of an error.

At the same time, the negative output terminal 173 transmits a negative potential to the reset terminals 157 and 165 causing the flip flops 127 and 129 to be reset to prepare them for further operation when the flip flop 131 is reset.

The function of the error-indicating signal at the positive output terminal 171 in typical digital data processors is to halt the operation of the data processor. The reset terminal 175 (normally maintained at a positive potential) can therefore be connected via a manually operated switch (not shown) to a negative potential source. Operation of the switch resets the flip flop 131 and reestablishes positive potentials at the reset terminals 157 and 165 thus priming the flip flops 127 and 129 for further operations.

Provisions can also be made for indicating the occurrence of an allowed code group. For example, if the flip flop 131 is not set when an S pulse occurs, a positive potential continues to exist at the negative output terminal 173.

This positive potential can be utilized to gate S through the gate 135 to set the flip flop 133. The positive signal which results at the positive output terminal 179 indicates that A is an allowed code group.

The reset terminal 181 operates in a manner similar to that of the reset terminal 175 and permits the flip flop 133 to be reset.

It should be noted that there is no intrinsic limitation on the speed with which the error-detecting apparatus can respond to pulses. For example, the apparatus can easily function in conjunction with circuits which supply pulses at rates in excess of one-hundred thousand pulses per second.

Thus, error-detecting apparatus has been shown in accordance with the invention for determining whether a code group is or is not one of a predetermined sequence of code groups.

DESCRIPTION OF SYMBOLS

The schematic equivalents of the symbols which have been employed to simplify the detailed description of the error-detecting apparatus will next be described. It should be understood that the circuits described can be replaced by other circuits which perform similar functions.

*Gate*

The gates used in the apparatus are of the "coincidence" type, each comprising a crystal diode network which functions to receive input signals via a plurality of input terminals and to pass the most negative signal.

Figure 5:
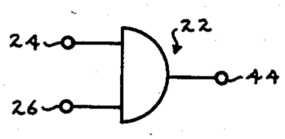
Fig. 5 shows a gate symbol.

The symbol for a representative gate 22, having two input terminals 24 and 26, is shown in Fig. 5. Since the signal potential levels are plus five volts (positive signals) and minus ten volts (negative signals), the potentials of the signals which may exist at the input terminals 24 and 26 are thereby limited.

If a potential of minus ten volts is present at one or both of the input terminals 24 and 26, a potential of minus ten volts exists at the output terminal 44. Therefore, if one of the input signals to the input terminals 24 and 26 is positive and the other signal is negative, the negative signal is passed and the positive signal is "blocked."

When there is a coincidence of positive signals at the two input terminals 24 and 26, a positive signal is transmitted from the output terminal 44. In such case, it may be stated that a positive signal is "gated" or "passed" by the gate 22.

Figure 6:
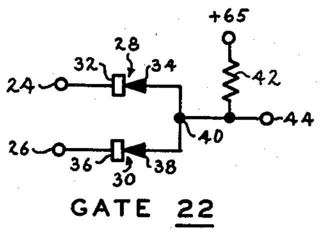
Fig. 6 illustrates the circuit represented by the symbol of Fig. 5.

The schematic details of the gate 22 are shown in Fig. 6. Gate 22 includes the crystal diodes 28 and 30. Each of the input terminals 24 and 26 is coupled to one of the crystal diodes 28 and 30. Crystal diode 28 comprises the cathode 32 and the anode 34. Crystal diode 30 comprises the anode 38 and the cathode 36. More particularly, the input terminals 24 and 26 are respectively coupled to the cathode 32 of the crystal diode 28 and the cathode 36 of the crystal diode 30. The anode 34 of the crystal diode 28 and the anode 38 of the crystal diode 30 are interconnected at the junction 40. The anodes 34 and 38 are coupled via the resistor 42 to the positive voltage bus 65.

If negative potentials are simultaneously present at the input terminals 24 and 26, both of the crystal diodes 28 and 30 conduct, since the positive supply bus 65 tends to make the anodes 34 and 38 more positive. The voltage at the junction 40 will then be minus ten volts since, while conducting, the anodes 34 and 38 of the crystal diodes 28 and 30 assume the potential of the associated cathodes 32 and 36.

When a positive signal is fed only to the input terminal 24, the cathode 32 is raised to a positive five volts potential and is made more positive than the anode 34, so that crystal diode 28 stops conducting. As a result, the potential at the junction 40 remains at the negative ten volts level. In a similar manner, when a positive signal is only present at the input terminal 26, the voltage at the junction 40 will not be changed.

When the signals present at both input terminals 24 and 26 are positive, the anodes 34 and 38 are raised to approximately the same potential as their associated cathodes 32 and 36 and the potential at the junction 40 rises to a positive potential of five volts.

The potential which exists at the junction 40 is transmitted from the gate 22 via the connected output terminal 44.

In the above described manner, the gate 22 is frequently used as a switch to govern the passage of one signal by the presence of one or more signals which control the operation of the gate 22.

It should be understood that the potentials of plus five volts and minus ten volts used for purpose of illustration are approximate, and the exact potentials will be affected in two ways. First, they will be affected by the value of the resistance 42 and its relation to the impedances of the input circuits connected to the input terminals 24 and 26. Second, they will be affected by the fact that a crystal diode has some resistance (i. e., is not a perfect conductor) when its anode is more positive than its cathode, and furthermore will pass some current (i. e., does not have infinite resistance) when its anode is more negative than its cathode. Nevertheless, the assumption that signal potentials are either plus five or minus ten volts is sufficiently accurate to serve as a basis for the description of the operations taking place in the apparatus.

A clamping diode may be connected to the output terminal 44 to prevent the terminal from becoming more negative than a predetermined voltage level to protect the diodes 28 and 30 against excessive back voltages and to provide the proper voltage levels for succeeding circuits.

*Buffer*

The buffers used in the apparatus are also known as "or" gates. Each buffer comprises a crystal diode network which functions to receive input signals via a plurality of input terminals and to pass the most positive signal.

Figure 7:
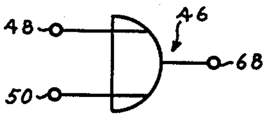
Fig. 7 shows the symbol for a buffer.

The symbol for a representative buffer 46, having two input terminals 48 and 50, is shown in Fig. 7. Since the signal potential levels in the system are minus ten volts and plus five volts, either one of these potentials may exist at the input terminals 48 and 50.

If a positive potential of five volts exists at one or both of the input terminals 48 or 50, a positive potential of five volts exists at the output terminal 68. If a negative potential of ten volts is present at both of the input terminals 48 and 50, a negative potential of ten volts will be present at the output terminal 68.

Figure 8:
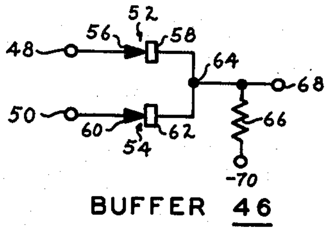
Fig. 8 illustrates the circuit represented by the symbol of Fig. 7.

The schematic details of the buffer 46 are shown in Fig. 8. The buffer 46 includes the two crystal diodes 52 and 54. The crystal diode 52 comprises the anode 56 and the cathode 58. Crystal diode 54 comprises the anode 60 and the cathode 62. The anode 56 of the crystal diode 52 is coupled to the input terminal 48. The anode 60 of the crystal diode 54 is coupled to the input terminal 50. The cathodes 58 and 62 of the crystal diodes 52 and 54, respectively, are joined at the junction 64 which is coupled to the output terminal 68, and via the resistor 66 to the negative supply bus 70. The negative supply bus 70 tends to make the cathodes 58 and 62 more negative than the anodes 56 and 60, respectively, causing both crystal diodes 52 and 54 to conduct.

When negative ten volt signals are simultaneously present at input terminals 48 and 50, the crystal diodes 52 and 54 are conductive, and the potential at the cathodes 58 and 62 approaches the magnitude of the potential at the anodes 56 and 60. As a result, a negative potential of ten volts appears at the output terminal 68.

If the potential at one of the input terminals 48 or 50 increases to plus five volts, the potential at the junction 64 approaches the positive five volts level as this voltage is passed through the conducting crystal diode 52 or 54 to which the voltage is applied. The other crystal diode 52 or 54 stops conducting since its anode 56 or 60 becomes more negative than the junction 64. As a result, a positive potential of five volts appears at the output terminal 68.

If positive five volt signals are fed simultaneously to both input terminals 48 and 50, a positive potential of five volts appears at the output terminal 68, since both crystal diodes 52 and 54 will remain conducting. Thus the buffer 46 functions to pass the most positive signal received via the input terminals 48 and 50.

*D.-C. amplifier*

The symbol for a representative D.-C. amplifier 148 is shown in Fig. 9. When a positive signal is present at the input terminal 150, a positive signal of five volts appears at the positive output terminal 236 and a negative signal of ten volts is present at the negative output terminal 238. If a negative potential is present at the input terminal 150, the potentials at the output terminals 236 and 238 are reversed.

As shown in Fig. 10, the D.-C. amplifier 148 includes the gate 154, the buffer 156, the vacuum tube 160, the transformer 183, the full-wave rectifiers 186 and 188, and the filters 220 and 214.

The input terminal 150 is connected to one input terminal of the gate 154. The other input of the gate 154 is fed a one megacycle carrier signal from the signal generator 152 which is a signal generator of known type. The megacycle carrier signal swings from minus ten to plus five volts.

One input of the buffer 156 is connected to the output of the gate 154. The other input of the buffer 156 is connected to the negative supply bus 5. The buffer 156 couples the output of the gate 154 to the control grid 170 of the vacuum tube 160.

The vacuum tube 160 is a five element tube having a grounded cylindrical shield 164, and includes the anode 162 connected via the primary winding 182 of the transformer 183 to a positive supply bus 250. The junction of the positive supply bus 250 and the primary winding 182 is coupled via the capacitor 184 to ground. The vacuum tube 160 also includes the suppressor grid 166 which is connected to ground, the screen grid 168 which is connected to the positive supply bus 125 and via the capacitor 158 to ground, and the cathode 172 which is grounded.

The anode 162 of the vacuum tube 160 is also connected via the coupling capacitor 174 to the neon tube 176 which is grounded. The capacitor 180 is connected in parallel with the primary winding 182 of the transformer 183 to form the parallel tank circuit 178 which is tuned to the frequency of the carrier signal.

The full-wave rectifier 186 is connected to the secondary winding 191 having its center tap 187 connected to the negative supply bus 10. The full-wave rectifier 186 includes the pair of crystal diodes 190 and 196. The anodes 192 and 198 of the crystal diodes 190 and 196 are respectively coupled to opposite ends of the secondary winding 191 of the transformer 183, and the cathodes 194 and 200 of the crystal diodes 190 and 196 are interconnected.

The full-wave rectifier 188 includes the pair of crystal ary winding 193 having its center tap 189 connected to the positive supply bus 5.

The full-wave rectifier 188 inclludes the pair of crystal diodes 202 and 208. The cathodes 204 and 210 of the crystal diodes 202 and 208 are coupled to opposite ends of the secondary winding 193, and the anodes 206 and 212 of the crystal diodes 202 and 208 are connected together.

The filter 220 which couples the cathodes 194 and 200 of the crystal diodes 190 and 196 to the positive output terminal 236 is a parallel tank circuit which includes the capacitor 224 and the inductor 222. The capacitor 226 connects the positive output terminal 236 to the negative supply bus 10. The positive output terminal 236 is also coupled via the resistor 230 to the negative supply bus 70.

The filter 214, which couples the anodes 206 and 212 of the crystal diodes 202 and 208 to the negative output terminal 238, is a parallel tank circuit which includes the capacitor 218 and the inductor 216. The capacitor 228 connects the negative output terminal 238 to the positive supply bus 5. The negative output terminal 238 is also coupled by the resistor 234 to the positive supply bus 65.

Initially, the crystal diodes 190 and 196 are in a conductive state such that the potential at the positive output terminal 236 is approximately minus ten volts. Similarly, the crystal diodes 202 and 208 are initially in a conductive state such that the potential at the negative output terminal 238 is approximately plus five volts.

When the signal is fed to the input terminal 159 it is combined with the one megacycle carrier and fed to the buffer 156. As previously noted, one input terminal of the buffer 156 is connected to a negative five volts supply bus so that all signals at the output of gate 156 which are equal to or more positive than minus five volts will be passed by the buffer 156. A signal passed by the buffer 156 is applied to the control grid 170 of the vacuum tube 160. The signal is amplified by vacuum tube 160 and appears across the parallel tank circuit 178. The parallel tank circuit 178 is tuned to the frequency of the incoming signal so that the maximum signal will be passed by the parallel tank circuit 178 to the full-wave rectifiers 186 and 188.

The full-wave rectifier 186 delivers a positive signal which is then filtered by the filter 220 to appear as a positive direct-current potential of approximately five volts at the positive output terminal 236. The full-wave rectifier 188 delivers a negative signal which is then filtered by the filter 214 to appear as a negative direct-current potential of approximately ten volts at the negative output terminal 238.

Thus, if a positive signal is present at the input terminal 150, the voltage at the positive output terminal 236 is plus five volts, and the potential at the negative output terminal 238 is minus ten volts. However, if no signal is present at the input terminal 150, the voltage at the positive output terminal 236 will be minus ten volts, and the potential at the negative output terminal 238 will be plus five volts.

Generally, it should be noted that this D.-C. amplifier is a carrier type D.-C. amplifier with positive and negative output signals comprising only one vacuum tube and producing output signals equal in magnitude to the input signals. It should also be noted that the D.-C. amplifier includes a transformer and rectifiers for producing output signals of the desired magnitude from a low impedance source, the D.-C. amplifier thereby being especially adaptable for use in conjunction with networks of crystal diodes.

*Flip flop*

A flip flop of the type used in the apparatus is a bistable electronic circuit with two output terminals, one of which is maintained at one potential level and the other of which is maintained at a second potential level to indicate one stable state. Upon the receipt of at least two signals of suitable magnitude the potential levels of the two output terminals are exchanged to indicate a second stable state.

The symbol for a representative flip flop 258 is illustrated in Fig. 11. The flip flop 258 comprises the input terminal 260, the reset terminal 268, positive output terminal 272 and one negative output terminal 274.

One stable state of the flip flop 258 is the normal condition which is designated "reset" and exists when a negative potential of ten volts appears at the positive output terminal 272 and a positive potential of five volts appears at the negative output terminal 274. The other stable state is designated "set" and exists when a positive potential of five volts appears at the positive output terminal 272 and a negative potential of ten volts appears at the negative output terminal 274.

The flip flop 258 is set when a positive signal is received via its input terminal 260, and a positive signal is present at its reset terminal 268. Therefore, the flip flop 258 will not be set if a reset (negative) signal is present at the reset terminal 268.

Once set, the flip flop 258 remains set as long as a positive signal is received via the reset terminal 268 even though the "setting" signal has terminated, but when the signal at the reset terminal 268 is negative, the flip flop 258 is then reset.

After being reset, the flip flop 258 remains reset until the above recited set conditions are fulfilled.

The detailed circuitry of the flip flop 258 is illustrated in Fig. 12 in which use is made of logical symbols previously described.

The flip flop 258 comprises the buffer 264, the gate 266 and the D.-C. amplifier 270 connected in series. The input terminal 260 is the input terminal of the buffer 264.

The buffer 264 is coupled to the gate 266. The reset terminal 268 is also coupled to the gate 266. When the gate 266 receives positive signals coincidentally from the buffer 264 and the reset terminal 268, the gate 266 passes a positive signal to the D.-C. amplifier 270, and causes the D.-C. amplifier 270 to generate a positive potential of five volts at its positive output terminal 272 and a negative potential of ten volts at its negative output terminal 274.

The positive output terminal 272 is coupled directly to the buffer 264 so that when a positive signal is generated at the positive output terminal 272, it is regenerative. The positive signal will be maintained at the positive output terminal 272 until the gate 266 is blocked by a negative signal received via the reset terminal 268.

It should be noted that a negative signal at the reset terminal 268 will prevent a positive pulse or signal at the input terminal 260 from setting the flip flop 258.

*Pulse amplifier*

Figure 13:
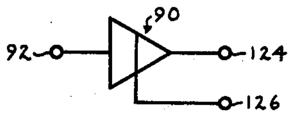
Fig. 13 shows the symbol for a pulse amplifier.

The symbol for a representative pulse amplifier is shown in Fig. 13. When a positive pulse is fed to the pulse amplifier 90 via the input terminal 92, the pulse amplifier 90 functions to transmit a positive pulse which swings from minus ten to plus five volts from its positive output terminal 124, and a negative pulse which swings from plus five to minus ten volts from its negative output terminal 126. At all other times, the pulse amplifier 90 has a negative potential of ten volts at its positive output terminal 124 and a positive potential of five volts at its negative output terminal 126.

Figure 14:
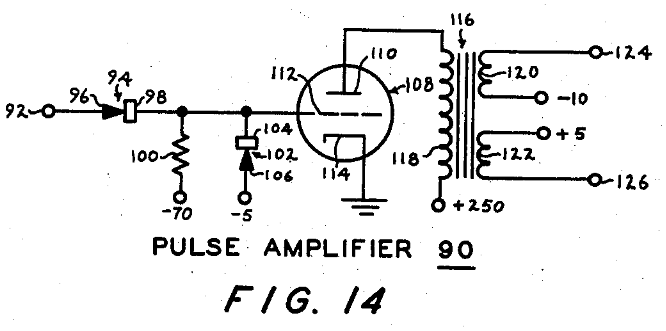
Fig. 14 shows the circuit represented by the symbol of Fig. 13.

The detailed circuitry of the pulse amplifier 90 is shown in Fig. 14. The pulse amplifier 90 includes the vacuum tube 108, the pulse transformer 116 and associated circuitry. The vacuum tube 108 comprises the cathode 114, the grid 112 and the anode 110. The pulse transformer comprises the primary winding 118 and the secondary windings 120 and 122.

The crystal diode 94 couples the grid 112 of the vacuum tube 108 to the input terminal 92, the anode 96 of the crystal diode 94 being coupled to the input terminal 92, and the cathode 98 being coupled to the grid 112. The negative supply bus 70 is coupled to the grid 112 via the resistor 100 and tends to make the crystal diode 94 conductive. The grid 112 and the cathode 98 of the crystal diode 94 are also coupled to the cathode 104 of the crystal diode 102, whose anode 106 is coupled to the negative supply bus 5. The crystal diode 102 clamps the grid 112 at a potential of minus five volts thus preventing the voltage applied to the grid 112 from becoming more negative than minus five volts.

When a voltage more positive than minus five volts is transmitted to the input terminal 92, the crystal diode 94 conducts and the voltage is applied to the grid 112. Since the crystal diode 102 clamps the grid 112 and the cathode 98 of the crystal diode 94 at minus five volts, any voltage more negative than minus five volts will cause the crystal diode 94 to become nonconductive, and that input voltage will be blocked at the crystal diode 94. Thus, the clamping action of the crystal diode 102 will not affect the circuitry which supplies the input voltage.

The cathode 114 of the vacuum tube 108 is connected to ground potential. The anode 110 of the vacuum tube 108 is coupled by the primary winding 118 of the pulse transformer 116 to the positive supply bus 250. The outer ends of the secondary windings 120 and 122 of the pulse transformer 116 are coupled respectively to the positive output terminal 124 and the negative output terminal 126. The inner ends of the secondary windings 120 and 122 are coupled respectively to the negative supply bus 10 and the positive supply bus 5.

A positive pulse which is fed to the grid 112 of the vacuum tube 108 will be inverted at the primary winding 118 of the pulse transformer 116 which is wound to produce a positive pulse in the secondary winding 120 and a negative pulse in the secondary winding 122. These pulses respectively drive the positive output terminal 124 up to a positive five volts potential and the negative output terminal 126 down to a negative ten volts potential because of the circuit parameters.

When the vacuum tube 108 is non-conducting, the negative ten volts potential is fed through the secondary winding 120 and appears at the positive output terminal 124. At the same time, the positive five volts potential is fed through the secondary winding 122 to the negative output terminal 126. These latter conditions are the normally existing conditions at the output terminals 124 and 126.

There will now be obvious to those skilled in the art many modifications and variations utilizing the principles set forth and realizing many or all of the objects and advantages of the circuits described but which do not depart essentially from the spirit of the invention.

What is claimed is:

1. Apparatus for inspecting the signals of a code group which is one of a sequence of code groups to determine whether the code group is one of a number of disallowed code groups which are included at the beginning and end of the sequence comprising receiving means for receiving the signals of the code group, first indicating means responsive to said receiving means for indicating whether the code group is a disallowed code group included at the beginning of the sequence, and second indicating means responsive to said receiving means for indicating whether the code group is a disallowed code group included at the end of the sequence.

2. Apparatus for inspecting the signals of a code group and indicating whether the code group precedes or follows a predetermined portion of a sequence of code groups comprising a source of standard signals, receiving means for receiving the standard signals and the signals of the code group, said receiving means including means to produce signals of the complement of the code group, and first and second comparing means responsive to said receiving means, said first comparing means comparing the signals of the code group with the standard signals to indicate whether the code group follows mathematically the predetermined portion of the sequence of code groups, said second comparing means comparing the signals of the complement of the code group with the standard signals to indicate whether the code group precedes mathematically the predetermined sequence of code groups.

3. In combination with a source of standard signals apparatus for inspecting the signals of a code group and indicating whether the code group is one of a predetermined sequence of code groups comprising receiving means for receiving the standard signals and the signals of the code group, said receiving means including means to produce signals of the complement of the code group, first and second comparing means responsive to said receiving means and said source of standard signals, said first comparing means comparing the signals of the code group with standard signals to indicate whether the code group follows in a mathematical manner the predetermined sequence of code groups, said second comparing means comparing the signals of the complement of the code group with standard signals to indicate whether the code group precedes in a mathematical manner the predetermined sequence of code groups, and combining means responsive to said first and second comparing means for indicating whether the code group is one of the predetermined sequence of code groups.

4. Electrical apparatus for inspecting electrical signals which represent a code group and indicating whether the code group is one of a predetermined sequence of code groups comprising a source of standard electrical signals, receiving means for receiving the standard electrical signals and the electrical signals which represent the code group, said receiving means including means to produce electrical signals which represent the complement of the code group, a first comparing means responsive to the electrical signals which represent the code group and standard electrical signals to indicate whether the code group mathematically follows the predetermined sequence of code groups, a second comparing means responsive to the electrical signals which represent the complement of the code group and standard electrical signals to indicate whether the code group mathematically precedes the predetermined sequence of code groups, and combining means responsive to said first and second comparing means for indicating whether the codeg roup is one of a predetermined sequence of code groups.

5. In combination with a source of standard electrical indicia an error-detecting device for inspecting the electrical indicia of a binary number which is one of a sequence of binary numbers, there being allowed and disallowed binary numbers in the sequence, each disallowed binary number being either greater or less than all of the allowed binary numbers in the sequence comprising receiving means for receiving the electrical indicia of the binary number, said receiving means including means for producing electrical indicia of the complement of the binary number, and first and second bi-stable devices each having a normal and second condition, said first bistable device being responsive to said source of standard electrical indicia and the electrical indicia of the binary number for being in and remaining in the second condition if the binary number is a disalloyed binary number which is greater than the allowed binary numbers, said second bi-stable device being responsive to said source of standard electrical indicia and the electrical indicia of the complement of the binary number for being in and remaining in the second condition if the binary number is a disallowed binary number which is less than the allowed binary numbers.

6. An error-detecting device for inspecting the signals of a binary number which is one of a sequence of binary numbers, there being allowed and disallowed binary numbers in the sequence, each disallowed binary number being either greater or less than all of the allowed binary numbers in the sequence comprising receiving means for sequentially receiving the signals of the binary number, said receiving means including means for producing signals of the complement of the binary number, and first and second bi-stable devices each having a normal and second condition, a source of standard signals, said first bi-stable device being responsive to said source of standard signals and the signals indicia of the binary number for being in and remaining in the second condition if the binary number is a disallowed binary number which is greater than the allowed binary numbers, said second bi-stable device being responsive to said source of standard signals and the signals of the complement of the binary number for being in and remaining in the second condition if the binary number is a disallowed binary number which is less than the allowed binary numbers.

7. An error-detecting device for inspecting the pulses of a binary number which is one of a sequence of binary numbers, there being allowed and disallowed binary numbers in the sequence, each disallowed binary number being either greater or less than all of the allowed binary numbers in the sequence comprising receiving means for sequentially receiving the pulses of the binary number, said receiving means including means for producing pulses of the complement of the binary number, first and second bi-stable devices each having a normal and second condition, a source of standard pulses, said first bi-stable device being responsive to said source of standard pulses and the pulses of the binary number for being in and remaining in the second condition if the binary number is a disallowed binary number which is greater than the allowed binary numbers, said second bi-stable device being responsive to said source of standard pulses and the pulses of the complement of the binary number for being in and remaining in the second condition if the binary number is a disallowed binary number which is less than the allowed binary numbers, and means responsive to said first and second bi-stable devices for indicating whether the binary number is a disallowed binary number.

8. Apparatus for inspecting the signals of a code group which is one of a sequence of code groups, the sequence including a predetermined sequence of allowed code groups, there being as many disallowed code groups preceding in a mathematical manner the predetermined sequence as there are disallowed code groups following in a mathematical manner the predetermined sequence, said apparatus comprising receiving means for receiving the signals of the code group, a source of signals of a standard code group, and comparing means including complementing means responsive to said two groups of signals at high speeds for indicating whether the code group is a disallowed code group.

9. Apparatus for inspecting the signals of a code group which is one of a sequence of code groups, the sequence including a predetermined sequence of allowed code groups, there being as many disallowed code groups preceding mathematically the predetermined sequence as there are disallowed code groups following mathematically the predetermined sequence, said apparatus comprising receiving means for receiving the signals of the code group and producing the signals of the complement of the code group, a source of signals of a standard code group, and comparing means responsive to the signals of the code group, the complement of the code group and the standard code group for indicating whether the code group is a disallowed code group.

10. Electrical apparatus for inspecting signals which represent a code group which is one of a sequence of code groups, the sequence including a predetermined sequence of allowed code groups, there being as many disallowed code groups mathematically preceding the predetermined sequence as there are disallowed code groups mathematically following the predetermined sequence, said apparatus comprising receiving means for receiving the signals which represent the code group and producing signals which represent the complement of the code group, a source of a signal which represents a standard code group, and comparing means responsive to the signals which represent the code group, the complement of the code group and the standard code group for indicating whether the code group is a disallowed code group.

11. Apparatus for inspecting the signals representing the bits of an $n$-bit code group which is one of the $2^n$ possible combinations of $n$ bits to determine whether the code group is one of the sequence of code groups defined by the limits of $r$ and $2^n-(r+1)$ comprising receiving means for receiving the signals representing the $n$-bit code group, said receiving means including means for producing signals representing the complement of the $n$-bit code group, a source of signals representing $r$, first comparing means responsive to said receiving means and said source of signals representing $r$ for comparing the signals representing the $n$-bit code group with the signals representing $r$ to indicate whether the $n$-bit code group lies above the limit $2^n-(r+1)$, and second comparing means responsive to said receiving means and said source of signals representing $r$ for comparing the signals representing the complement of the $n$-bit code group with the signals representing $r$ to indicate whether the $n$-bit code group lies below the limit of $r$.

12. Apparatus for inspecting signals representing the bits of an $n$-bit code group which is one of $2^n$ possible combinations of $n$ bits to determine whether the code group is one of the sequence of code groups defined by the limits of $r$ and $2^n-(r+1)$ comprising receiving means for receiving the signals representing the $n$-bit code group, said receiving means including means for producing signals representing the complement of the $n$-bit code group, a source of signals representing $r$, first comparing means responsive to said receiving means and said source of signals representing $r$ for comparing the signals representing the $n$-bit code group with the signals representing $r$ to indicate whether the $n$-bit code group lies above the limit $2^n-(r+1)$, second comparing means responsive to said receiving means and said source of signals representing $r$ for comparing the signals representing the complement of the $n$-bit code group with the signals representing $r$ to indicate whether the $n$-bit code group lies below the limit of $r$, and combining means responsive to said first and second comparing means for indicating whether the $n$-bit code group is one of the sequence.

13. Apparatus for inspecting signals representing the bits of an $n$-bit code group which is one of $2^n$ possible combinations of $n$ bits to determine whether the code group is one of the sequence of code groups defined by the limits of $r$ and $2^n-(r+1)$ comprising receiving means for receiving the signals representing the $n$-bit code group, said receiving means including means for producing signals representing the complement of the $n$-bit code group, a source of signals representing $r$, first comparing means responsive to said receiving means and said source of signals representing $r$ for comparing the signals representing the $n$-bit code group with the signals representing $r$ to indicate whether the $n$-bit code group lies above the limit $2^n-(r+1)$, second comparing means responsive to said receiving means and said source of signals representing $r$ for comparing the signals representing the complement of the $n$-bit code group with the signals representing $r$ to indicate whether the $n$-bit code group lies below the limit of $r$, and combining means responsive to said first and second comparing means for indicating if the $n$-bit code group is not one of the sequence.

14. An error-detecting device for inspecting signals representing an $n$-bit primary number which is one of $2^n$ possible combinations of $n$-bits to determine whether the $n$-bit binary number lies within a sequence of binary numbers defined by the limits of $r$ and $2^n-(r+1)$ comprising receiving means for receiving the signals representing the $n$-bit binary number, said receiving means producing signals representing the complement of the $n$-bit binary number, a source of signals representing $r$, first and second bi-stable devices each having a normal and second condition, said first bi-stable device being responsive to the signals representing $r$ and the signals representing the binary number for being in and remaining in the second condition when the binary number is a binary number which is greater than $2^n-(r+1)$, said second bi-stable device being responsive to the signals representing $r$ and the complement of the binary number for being in and remaining in the second condition when the binary number is a binary number which is less than $r$, and combining means responsive to said first and second bi-stable devices for indicating whether the binary number is one of the sequence of binary numbers defined by the limits of $r$ and $2^n-(r+1)$.

15. An error-detecting device for inspecting signals representing an $n$-bit binary number which is one of $2^n$ possible combinations of $n$-bits to determine whether the $n$-bit binary number lies within a sequence of binary numbers defined by the limits of $r$ and $2^n-(r+1)$ comprising receiving means for receiving the signals representing the $n$-bit binary number, said receiving means producing signals representing the complement of the $n$-bit binary number, a source of signals representing $r$, first and second bi-stable devices each having a normal and second condition, said first bi-stable device being responsive to the signals representing $r$ and the signals representing the binary number for being in and remaining in the second condition when the binary number is a binary number which is greater than $2^n-(r+1)$, said second bi-stable device being responsive to the signals representing $r$ and the complement of the binary number for being in and remaining in the second condition when the binary number is a binary number which is less than $r$, and combining means responsive to said first and second bi-stable devices for indicating whether the binary number is one of the sequence of binary numbers defined by the limits of $r$ and $2^n-(r+1)$.

16. An error-detecting device for inspecting signals representing an $n$-bit binary number which is one of $2^n$ possible combinations of $n$-bits to determine whether the $n$-bit binary number lies within a sequence of binary numbers defined by the limits of $r$ and $2^n-(r+1)$ comprising receiving means for receiving the signals representing the $n$-bit binary number, said receiving means producing signals representing the complement of the $n$-bit binary number, a source of signals representing $r$, first and second bi-stable devices each having a normal and second condition, said first bi-stable device being responsive to the signals representing $r$ and the signals representing the binary number for being in and remaining in the second condition when the binary number is a binary number which is greater than $2^n-(r+1)$, said second bi-stable device being responsive to the signals representing $r$ and the complement of the binary number for being in and remaining in the second condition when the binary number is a binary number which is less than $r$, and combining means responsive to said first and second bi-stable devices for indicating whether the binary number is one of the sequence of binary numbers defined by the limits of $r$ and $2^n-(r+1)$.

References Cited in the file of this patent

UNITED STATES PATENTS

| | | |
|---|---|---|
| 2,364,540 | Luhn | Dec. 5, 1944 |
| 2,589,465 | Weiner | Mar. 18, 1952 |
| 2,607,006 | Hoeppner | Aug. 12, 1952 |
| 2,608,615 | Oberman | Aug. 26, 1952 |
| 2,648,829 | Ayres | Aug. 11, 1953 |
| 2,679,638 | Bensky | May 25, 1954 |
| 2,693,593 | Crosman | Nov. 2, 1954 |

FOREIGN PATENTS

| | | |
|---|---|---|
| 1,040,913 | France | May 27, 1953 |